United States Patent
Hoshino et al.

(10) Patent No.: US 6,552,684 B2
(45) Date of Patent: Apr. 22, 2003

(54) DIRECTION OF ARRIVAL ESTIMATION METHOD AND RADIO RECEPTION APPARATUS

(75) Inventors: Masayuki Hoshino, Yokosuka (JP); Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/936,556

(22) PCT Filed: Jan. 17, 2001

(86) PCT No.: PCT/JP01/00249
§ 371 (c)(1),
(2), (4) Date: Sep. 14, 2001

(87) PCT Pub. No.: WO01/54312
PCT Pub. Date: Jul. 26, 2001

(65) Prior Publication Data
US 2002/0158799 A1 Oct. 31, 2002

(30) Foreign Application Priority Data
Jan. 17, 2000 (JP) ......................... 2000-008292

(51) Int. Cl.$^7$ .............. G01S 5/02; H01Q 3/26
(52) U.S. Cl. ............ 342/424; 342/372; 342/422
(58) Field of Search .................. 342/423, 424, 342/372, 378, 417, 422

(56) References Cited

U.S. PATENT DOCUMENTS

| 5,936,577 A | 8/1999 | Shoki et al. |
| 6,061,553 A | 5/2000 | Matsuoka et al. |
| 6,188,913 B1 * | 2/2001 | Fukagawa et al. ........ 342/372 |

FOREIGN PATENT DOCUMENTS

| GB | 2337419 | 11/1999 |
| JP | 05259950 | 10/1993 |
| JP | 09219675 | 8/1997 |
| JP | 09261008 | 10/1997 |
| JP | 11251964 | 9/1999 |
| JP | 11331125 | 11/1999 |
| JP | 2001036451 | 2/2001 |

OTHER PUBLICATIONS

International Search Report dated Apr. 3, 2001.

* cited by examiner

*Primary Examiner*—Thomas H. Tarcza
*Assistant Examiner*—Fred H Mull
(74) *Attorney, Agent, or Firm*—Stevens, Davis, Miller & Mosher, LLP

(57) ABSTRACT

Spatial profile creation section 102 creates an intensity distribution, that is, a spatial profile or spatial information of reception signals with respect to the directions of arrival of signals using reception signals prior to despreading received via antenna elements 101-1 to 101-4. Direction of arrival estimation section 103 estimates the directions of arrival of signals sent from other parties of communication from the spatial information created by spatial profile creation section 102 and divides and outputs the information of the directions of arrival to reception units 104-1 to 104-4 according to the direction of arrival. Beam formers 111 in reception units 104-1 to 104-4 each rotate the phase of the output reception signals from antenna elements 101-1 to 101-4 at predetermined angles based on the information of directions of arrival and combines these rotated reception signals so as to increase the reception levels of the signals sent from the directions of arrival.

9 Claims, 5 Drawing Sheets

DIRECTION OF ARRIVAL ESTIMATION METHOD AND RADIO RECEPTION APPARATUS

TECHNICAL FIELD

The present invention relates to a direction of arrival estimation method using an array antenna and a radio reception apparatus.

BACKGROUND ART

FIG. 1 is a block diagram showing a conventional radio reception apparatus using an array antenna. In FIG. 1, the conventional radio reception apparatus has units 10-1 to 10-N corresponding in number to the channels received.

Reception units 10-1 to 10-N each mainly comprise the same number of despreading sections 12-1 to 12-M as the antenna elements of array antenna 11, direction of arrival estimation section 13 for estimating the directions of arrival of signals based on the outputs of despreading sections 12-1 to 12-M, beam former 14 for forming directivities in the directions of arrival estimated by direction of arrival estimation section 13 and letting the outputs of despreading sections 12-1 to 12-M pass according to the formed directivities and channel reception section 15 for extracting a channel signal from the output of beam former 14. The array antenna has a configuration of a plurality of antenna elements linearly spaced at intervals of half-wavelength of a carrier frequency.

Here, a beam search technique will be explained as an example of the direction of arrival estimation method. An input signal vector X(t) of the antenna is given by following expression (1).

$$X(t)=[x0(t),x1(t), \ldots ,xn(t)]T \quad (1)$$

Furthermore, vector a(è) having a peak in a è direction (called a "steering vector") is given by expression (2).

$$a(è)=[1,\exp(-j\Pi \sin è), \ldots ,\exp(-jn\Pi \sin è)]T \quad (2)$$

By carrying out reception using the above expression, it is possible to observe power in the è direction included in X(t). That is, spatial profile H(è) can be determined by following expression (3).

$$H(è)=a(è)T \cdot X(t) \quad (3)$$

From this, a spatial profile of X(t) over a 180° sector extending ahead can be determined. Here, è takes a value between −90° and 90°.

Beam forming in an array antenna is obtained by multiplying a reception signal from each antenna element by a complex amplitude and giving an arbitrary directivity using the result thereof.

An example of beam forming of the array antenna will be explained below. FIG. 2 illustrates an example of beam forming of an array antenna. In FIG. 2, base station apparatus 21 has four antenna elements, forms directivities and performs communications with mobile stations 22 and 23.

When base station apparatus 21 communicates with mobile station 22 located in the è direction, the input signal vector of the four antenna elements is given by expression (4) using expression (1).

$$X(t)=[x0(t),x1(t),x2(t),x3(t)]T \quad (4)$$

Then, when the directivity of the array antenna is directed to mobile station 22 at angle è from base station apparatus 21, steering vector a(è) is given by expression (5).

$$a(è)=[1,\exp(-j\Pi \sin è),\exp(-j2\Pi \sin è)]T \quad (5)$$

By carrying out a vector multiplication of expression (4) and expression (5) on the reception signal, the array antenna of base station apparatus 21 forms a directivity with a large gain in the è direction. For example, an array antenna with four linearly spaced antenna elements has a maximum gain in the è direction and the gain at an angle greater than 22.5° from the è direction is less than half the maximum gain.

Thus, beam forming forms directivities by phase-rotating signals received from the respective antennas of the array antenna by an arbitrary angle and then combining those signals. That is, by branching the signals received from the respective antenna elements to a plurality of groups and applying different ways of combination thereto, beam forming can form directivities with a high gain in a plurality of different directions. As a result, beam forming can form directivities appropriate for carrying out communications with a plurality of other parties of communication.

For example, it is possible to carry out processing of using beam 24 in the θ direction for communication with mobile station 22 in the θ direction and processing of using beam 25 in the φ direction for communication with mobile station 23 in the φ direction simultaneously.

Thus, base station apparatus 21 can receive signals of a plurality of other parties of communication individually by carrying out processing on signals output from the beam former through different reception units provided for the other parties of communication.

However, since the conventional radio reception apparatus estimates the directions of arrival of signals for their respective channels individually, it is not possible to achieve accuracy enough to estimate the directions of arrival due to interference received from other stations under circumstances in which many mobile stations exist adjacent to one another, hence it is not possible to form optimal antenna directivities for reception.

Moreover, to estimate the directions of arrival of radio signals for their respective channels, it is necessary to provide reception units 10-1, 10-2, . . . , 10-N for the respective channels, which requires the same number of direction of arrival estimation sections as channels received by reception units 10-1, 10-2, . . . , 10-N and despreading sections corresponding to (the number of channels×the number of antennas), increasing the scale of the circuit and costs.

DISCLOSURE OF INVENTION

It is an object of the present invention to provide a direction of arrival estimation method and a radio reception apparatus capable of reducing the scale of the circuit and preventing deterioration of reception quality even if many mobile stations exist adjacent to one another deteriorating the accuracy of direction of arrival estimations of signals.

This object is attained by calculating an intensity distribution of reception signals with respect to the directions of arrival of signals from the reception signals before they are separated according to their respective channels, estimating the directions of arrival of signals in band units (i. e., signals for each band) based on this intensity distribution, determining antenna directivities and receiving signals accordingly, grouping signals coming from quasi-identical directions and estimating the directions of arrival thereof, receiving radio signals with antenna directivities formed in the directions of arrival estimated in group units, and receiving the signals in group units and separating or extracting desired signals.

BEST MODE FOR CARRYING OUT THE INVENTION

With reference now to the attached drawings, an embodiment of the present invention will be explained below.
(Embodiment 1)

With reference to the attached drawings, an embodiment of the present invention will be explained in detail below.

Figure 1:
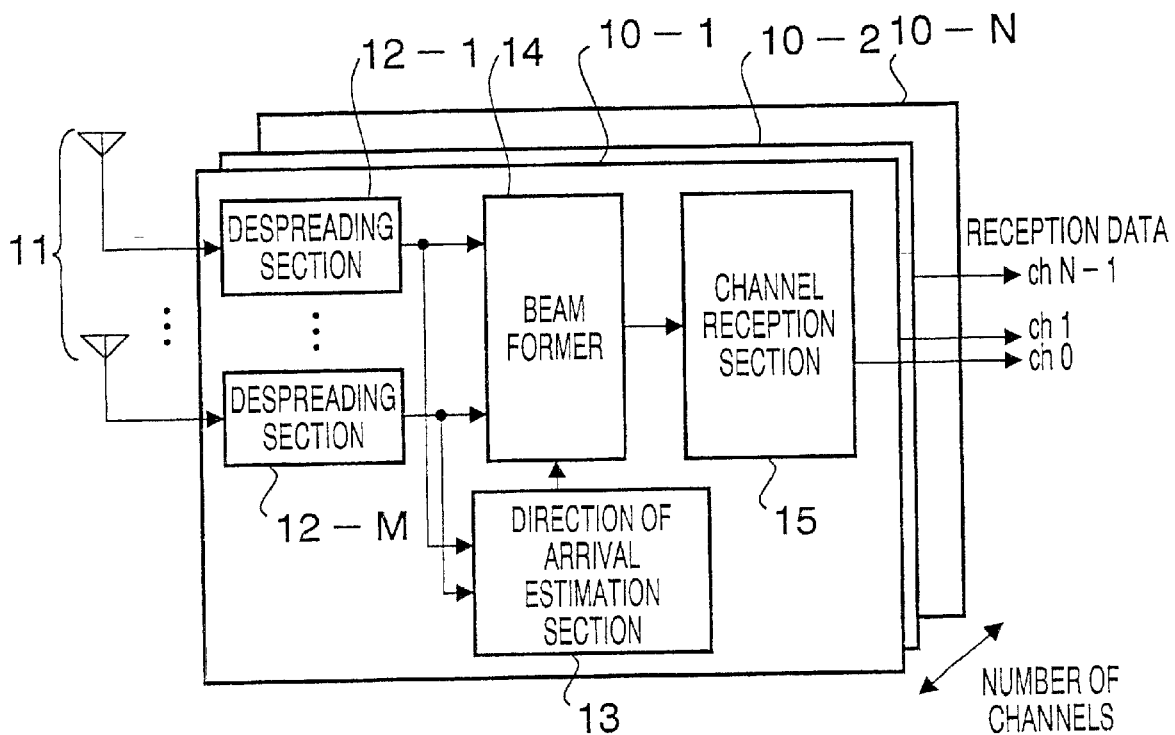
FIG. 1 is a block diagram showing a configuration of a conventional radio reception apparatus.
Figure 2:
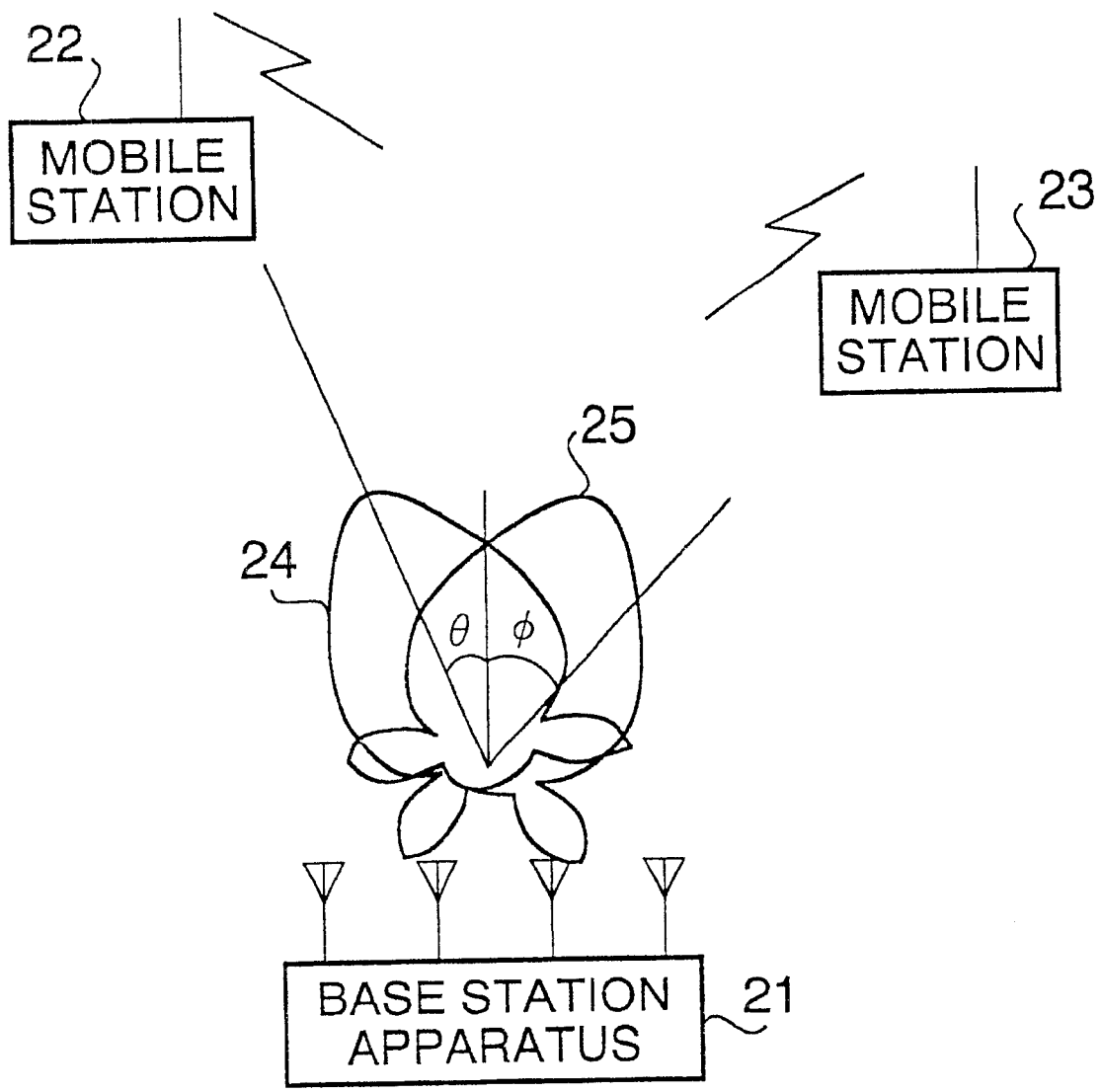
FIG. 2 illustrates an example of beam forming.
Figure 3:
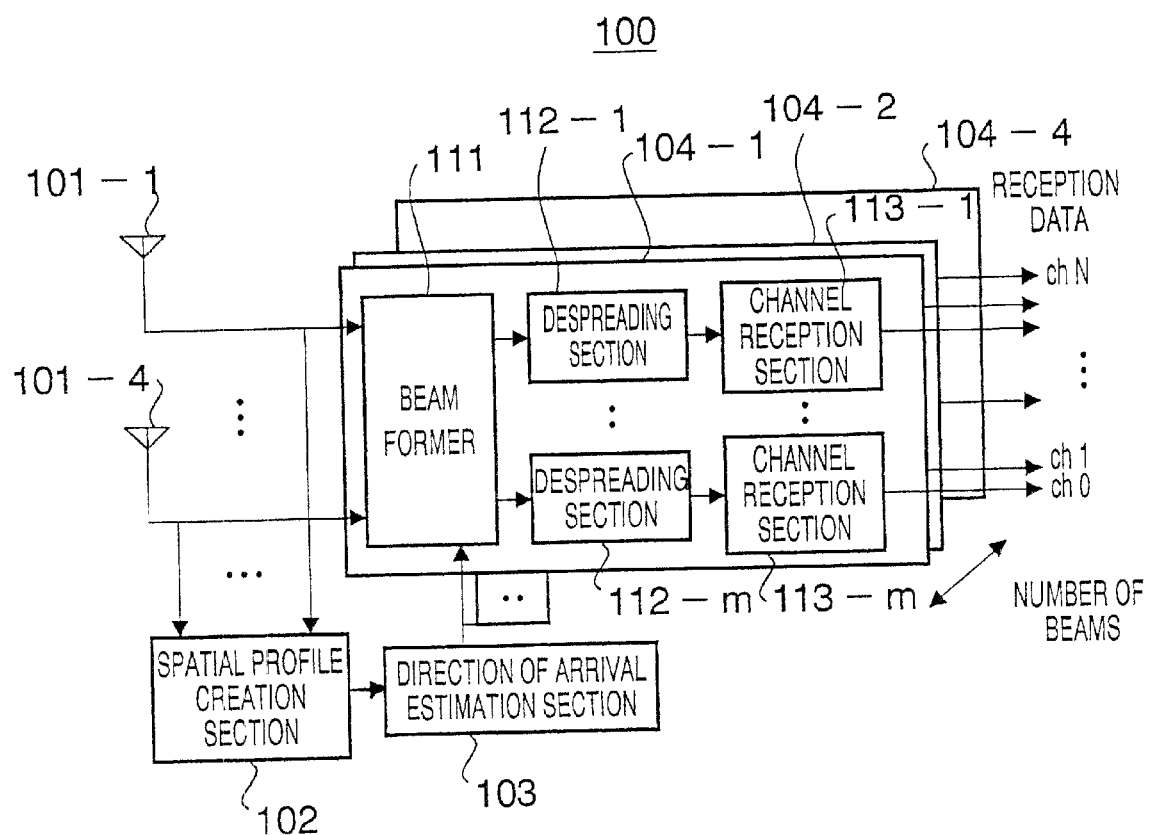
FIG. 3 is a block diagram showing a configuration of a radio reception apparatus according to an embodiment of the present invention.

FIG. 3 is a block diagram showing a configuration of a radio reception apparatus according to the embodiment of the present invention. In FIG. 3, radio reception apparatus 100 is mainly constructed of a plurality of antenna elements 101-1 to 101-4, spatial profile creation section 102, direction of arrival estimation section 103 and a plurality of reception units 104-1 to 104-4. Radio reception apparatus 100 can form directivities corresponding in number to beam formers 111.

Here, a case will be explained where it is assumed that the maximum number of channels that can be handled by radio reception apparatus 100 is 20, 5 channels of signals to be demodulated are assigned to reception units 104-1 to 104-4 and the number of beams formed from antennal elements 101-1 to 101-4 is 4. However, the number of antenna elements, despreading sections and channel reception sections in radio reception apparatus 100 of this embodiment are not limited particularly.

Furthermore, reception units 104-1 to 104-4 are mainly constructed of beam former 111, a plurality of despreading sections 112-1 to 112-m and a plurality of channel reception sections 113-1 to 113-m, respectively.

Antenna elements 101-1 to 101-4 output the received radio signals to spatial profile creation section 102 and reception units 104-1 to 104-4 as reception signals.

Spatial profile creation section 102 creates an intensity distribution, that is, a spatial profile or spatial information of the reception signals for the directions of arrival using the reception signals prior to despreading received via antenna elements 101-1 to 101-4.

Direction of arrival estimation section 103 estimates the directions of arrival of signals sent from other parties of communication from the spatial information created by spatial profile creation section 102 and divides and outputs information of the directions of arrival to reception units 104-1 to 104-4 according to the direction of arrival.

Reception units 104-1 to 104-4 create antenna directivities, that is, beams from the information of the respective directions of arrival, receive radio signals and multiply the received signals by spreading codes corresponding to the signals in the directions of arrival and separate signals of the respective channels.

Internal configurations of reception units 104-1 to 104-4 will be explained below.

Beam former 111 rotates the phase of output reception signals from antenna elements 101-1 to 101-4 at their respective predetermined angles based on the information of direction of arrival and combines the rotated reception signals so that the reception levels of signals transmitted from the respective directions of arrival become high. As a result, beam former 111 forms beams in the directions of arrival of the signals estimated by direction of arrival estimation section 103.

Despreading sections 112-1 to 112-m despread the signals combined by beam former 111 and output the despread signals to channel reception sections 113-1 to 113-m. Here, the spreading codes used for despreading are the spreading codes used for spreading by the signals sent from the respective directions of arrival.

Channel reception sections 113-1 to 113-m demodulate signals output from despreading sections 112-1 to 112-m.

Adopting such configurations, reception units 104-1 to 104-4 receive signals coming from quasi-identical directions using antennas that form the same directivity, separate them and can thereby obtain desired signals.

Figure 4:
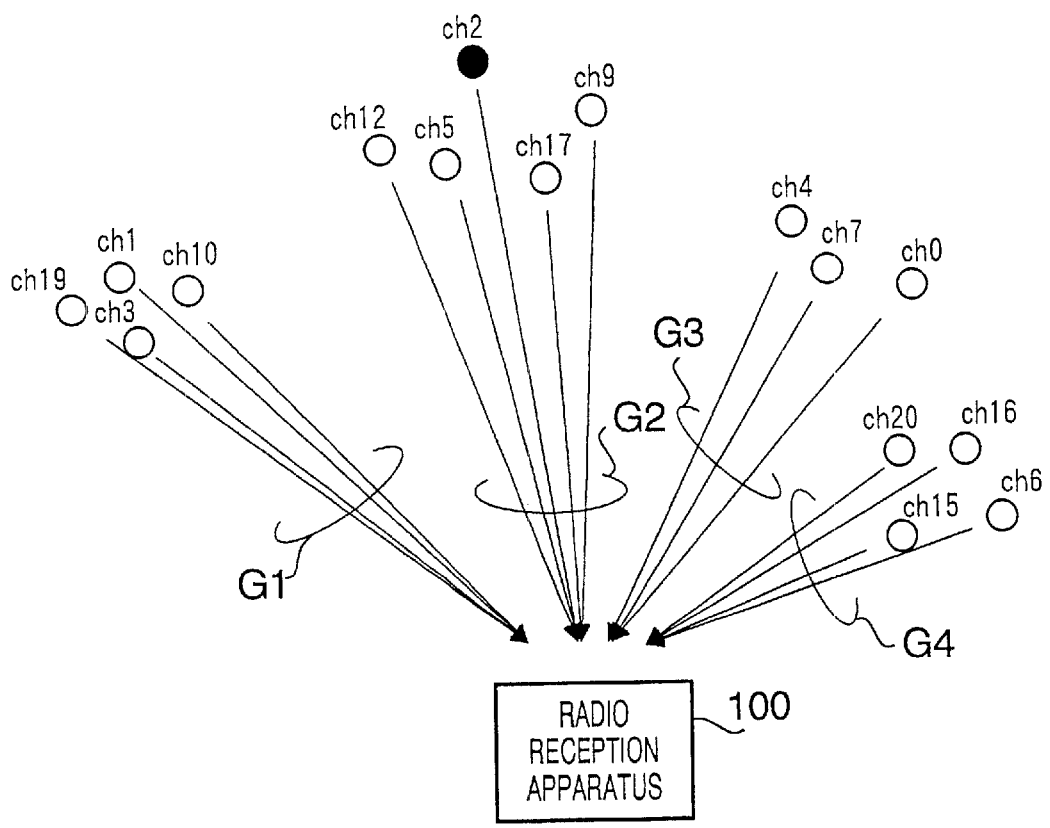
FIG. 4 is a schematic diagram to explain an operation of the radio reception apparatus according to the embodiment of the present invention.

Then, an operation of radio reception apparatus 100 according to this embodiment will be explained. FIG. 4 is a schematic diagram showing directions of the other parties with which the radio reception apparatus according to this embodiment communicates.

In FIG. 4, the radio reception apparatus communicates with the other parties of communication through 16 channels. Here, the other parties of communication that carry out communications through channels ch1, ch3, ch10 and ch19 exist in directions adjacent to one another viewed from the radio reception apparatus. Direction of arrival estimation section 103 estimates the directions of arrival of the other parties of communication that carry out communications through these channels ch1, ch3, ch10 and ch19 as one group G1, extracts signals by carrying out same beam forming processing, carries out despreading by multiplying these signals by their respective spreading codes and extracts the signals of the respective channels.

On the other hand, the other parties of communication that carry out communications through channels ch2, ch5, ch9, ch12 and ch17 exist in directions adjacent to one another viewed from the radio reception apparatus. Direction of arrival estimation section 103 estimates the directions of arrival of the other parties of communication that carry out communications through these channels ch2 ch5, ch9, ch12 and ch17 as one group G2, extracts signals by carrying out same beam forming processing, carries out despreading by multiplying these signals by the respective spreading codes and extracts the signals of the respective channels.

Likewise, the other parties of communication that carry out communications through channels ch0, ch4 and ch7 exist in directions adjacent to one another viewed from the radio reception apparatus. Direction of arrival estimation section 103 estimates the directions of arrival of the other parties of communication that carry out communications through these channels ch0, ch4 and ch7 as one group G3, extracts signals by carrying out same beam forming processing, carries out despreading by multiplying these signals by the respective spreading codes and extracts the signals of the respective channels.

Then, the other parties of communication that carry out communications through channels ch6, ch15, ch16 and ch20 exist in directions adjacent to one another viewed from the radio reception apparatus. Direction of arrival estimation section 103 estimates the directions of arrival of other parties of communication that carry out communications through these channels ch6, ch15, ch16 and ch20 as one group G4, extracts signals by carrying out same beam forming processing, carries out despreading by multiplying these signals by the respective spreading codes and extracts the signals of the respective channels.

Thus, the radio reception apparatus of this embodiment calculates an intensity distribution of reception signals in the directions of arrival of the signals using reception signals prior to despreading processing, estimates the directions of arrival in band units with a peak and can thereby estimate the directions of arrival for a number of other parties of communication that exist in directions adjacent to one another together as one group.

Figure 5:
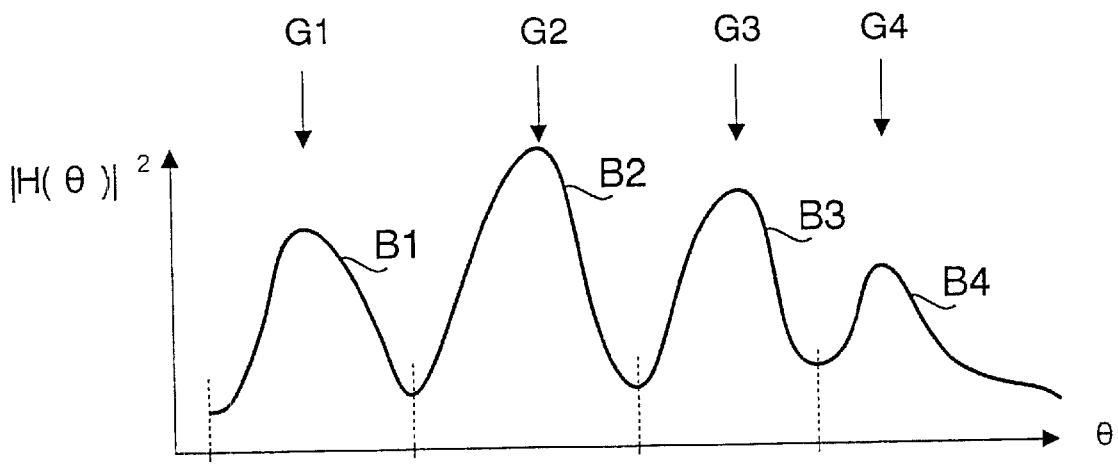
FIG. 5 illustrates a spatial spectrum showing an entire reception signal before despreading in the radio reception apparatus according to the embodiment of the present invention.

Then, a intensity distribution of reception signals with respect to the directions of arrival of signals will be explained. FIG. 5 illustrates an example of a spatial spectrum obtained by estimating the directions of arrival using reception signals prior to despreading processing.

In FIG. 5, the vertical axis shows the square of an absolute value of reception power and the horizontal axis shows the angle of direction of arrival viewed from the radio reception apparatus of this embodiment. The spatial spectrum in FIG. 5 shows peaks of G1, G2, G3 and G4, each representing a group of signals sent from other parties of communication adjacent to one another. The radio reception apparatus of this embodiment forms antenna directivities by measuring the directions of arrival of these peaks G1, G2, G3 and G4.

For example, suppose the beam corresponding to band B1 shown in FIG. 5 is generated by reception unit 104-1, the beam corresponding to band B2 is generated by reception unit 104-2, the beam corresponding to band B3 is generated by reception unit 104-3 and the beam corresponding to band B4 is generated by reception unit 104-4. Control means which is not shown gives spreading codes for users of ch1, ch3, ch19 and ch10 to m despreading sections 112-1 to 112-m of reception unit 104-1, spreading codes for users of ch2, ch9, ch12, ch15 and ch17 to 5 despreading sections 112-1 to 112-5 of reception unit 104-2, spreading codes for users of ch0, ch4, and ch7 to 3 despreading sections 112-1 to 112-3 of reception unit 104-3 and spreading codes for users of ch6, ch15, ch16 and ch20 to 4 despreading sections 112-1 to 112-4 of reception unit 104-4.

Furthermore, directivities may also be formed so that the reception sensitivity in the directions of peaks that exist in other than desired directions, that is, directivities that become null. This method is also described in the Unexamined Japanese Patent Publication No.HEI 9-261008.

In this case, by forming antenna directivities that cause the reception sensitivity for the directions of peaks that exist in other than desired directions of arrival to become zero, the reception apparatus of the present invention can reduce the reception intensity of interference components and improve an SIR (Signal to Interference Ratio) of the desired signals.

Figure 6:
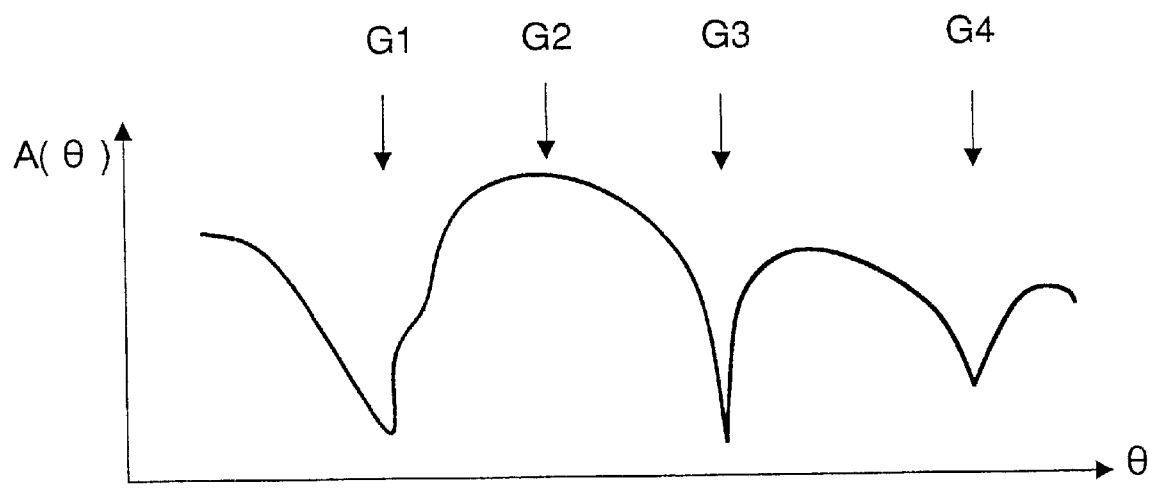
FIG. 6 illustrates a spatial spectrum of ch2 after despreading in the radio reception apparatus according to the embodiment of the present invention.

FIG. 6 illustrates an example of beam pattern, which is an antenna directivity. In FIG. 6, the vertical axis denotes an antenna gain and the horizontal axis denotes the direction of the directivity.

In FIG. 6, an antenna directivity is formed for when a signal coming from peak G2 is received. The beam pattern in FIG. 6 shows a large gain in the direction of peak G2. Furthermore, the beam pattern in FIG. 6 shows smaller gain in the directions of peak G1, G3 and G4, constituting a so-called "null" directivity.

Forming the directivity shown in FIG. 6 for the beam pattern increases the gain in the direction of peak G2 and allows a radio signal coming from the direction of peak G2 to be received with strong intensity. On the other hand, the beam pattern in FIG. 6 shows a small gain in the direction of peaks G1, G3 and G4, and therefore by receiving radio signals coming from the directions of peaks G1, G3 and G4 which become interference components with weak intensity, it is possible to receive the signal from band B2 including a plurality of signals coming from the peak G2 direction, while reducing signals coming from band B3 including a plurality of signals coming from the peak G3 direction and band B4 including a plurality of signals coming from the peak G4 direction, that is, interference components.

By applying reception processing to the signals received from the antenna that has formed the directivities shown in FIG. 6 and multiplying the signals by the spreading code of ch2, it is possible to extract the ch2 signal from among signals coming from the peak G2 direction, that is, ch2, ch5, ch9, ch12 and ch17 included in band B2.

Figure 7:
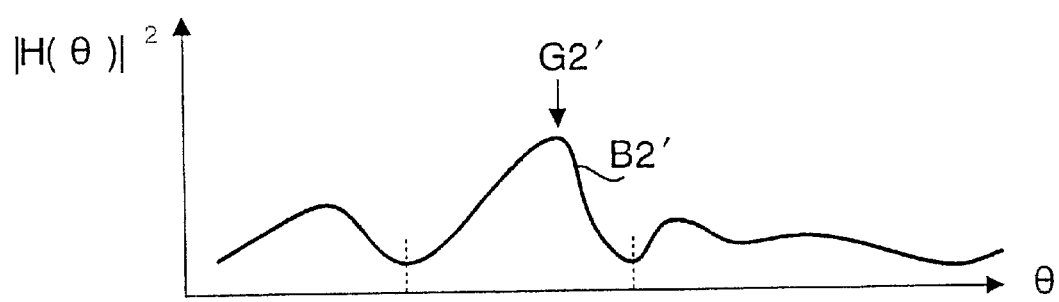
FIG. 7 illustrates a beam pattern in a radio reception apparatus according to the embodiment of the present invention.

FIG. 7 illustrates an example of beam pattern after despreading. In FIG. 7, the vertical axis shows the square of an absolute value of reception power and the horizontal axis shows the angle of the direction of arrival viewed from the radio reception apparatus of this embodiment. The spatial spectrum in FIG. 7 is a spectrum after the reception signal is multiplied by the spreading code corresponding to ch2.

Peaks G1' and B2' containing the ch2 signal have high reception power, while reception power corresponding to other directions is low.

As shown above, the reception apparatus of the present invention generates an intensity distribution of reception signals with respect to the directions of arrival of signals, estimates the directions of arrival of signals in band units from the above-described intensity distribution, thereby forms antenna directivities in groups of a plurality of signals coming from a quasi-identical direction, receives and separates these signals, which requires fewer circuits necessary to separate signals than the number of channels, that is, requiring only the number of grouped signals, making it possible to reduce the scale of the circuit and reduce costs.

Furthermore, since the present invention does not require direction of arrival estimating means for every channel and estimates directions of arrival group by group, and can thereby reduce the scale of the circuit and reduce costs.

Moreover, when many mobile stations exist adjacent to one another which deteriorates the accuracy of direction of arrival estimations, the reception apparatus of the present invention generates beams capable of receiving signals strongly in the directions in which the mobile stations exist and processes many signals all together, and can thereby prevent deterioration of the accuracy.

Furthermore, it is also possible to use this embodiment as processing prior to a multi-user type interference canceller. Combining the multi-user type interference canceller and the array antenna requires propagation paths of other channels to be estimated for every beam pattern, which makes it possible to use beam patterns commonly and thereby drastically reduce the scale of the circuit.

The embodiment in this case can be implemented by comprising an interference component elimination section that separates the reception signals of despreading sections 112-1 to 112-m in FIG. 3 into desired signals and interference components and subtracts the interference signals from the reception signals output from beam former 111.

Furthermore, this embodiment has described the case of the code multiplexing system, but the present invention is not limited to this and can also use a time division system, etc. as far as it provides multiplexed communications.

Moreover, creating a spatial profile using signals prior to despreading prevents effects of a process gain, which is obtained by carrying out steps of spreading and despreading from being obtained. Thus, averaging the spatial profile values over time can eliminate noise.

As is apparent from the explanations above, the present invention can reduce the scale of the circuit by creating an intensity distribution of reception signals with respect to the directions of arrival of signals, assuming the directions of arrival of signals in band units from the above-described intensity distribution, forming antenna directivities in units of a plurality of signals coming from a quasi-identical direction, and receiving and separating the signals. Furthermore, even when many mobile stations exist adjacent to one another, thus deteriorating the accuracy of direction of arrival estimations of signals, the present invention can prevent deterioration of reception quality.

This application is based on the Japanese Patent Application No.2000-008292 filed on Jan. 17, 2000, entire content of which is expressly incorporated by reference herein.

What is claimed is:

1. A radio reception apparatus comprising:
    spectrum generating means for generating an intensity distribution of reception signals with respect to directions of arrival of signals;
    direction of arrival estimating means for estimating the directions of arrival of signals for each band in said intensity distribution;
    directivity forming means for forming antenna directivities in the estimated directions of arrival; and
    signal separating means for receiving signals for said each band with said directivities and separating desired signals from the received signals.

2. The radio reception apparatus according to claim 1, wherein the direction of arrival estimating means estimates intensity distribution peaks as the directions of arrival.

3. The radio reception apparatus according to claim 1, wherein the directivity forming means forms directivities with low reception sensitivity in the estimated directions of arrival other than the directions of arrival including desired signals.

4. The radio reception apparatus according to claim 1, wherein the spectrum generating means generates an intensity distribution with respect to the directions of arrival of signals using reception signals prior to despreading and the signal separating means separates the desired signals from the signals received with spreading codes corresponding to the desired signals multiplied.

5. The radio reception apparatus according to claim 1, wherein the signal separating means comprises interference eliminating means for separating the reception signals into desired signals and interference components and subtracting said interference components from said reception signals.

6. The radio reception apparatus according to claim 1, wherein the signal separating means multiplies the reception signals by the spreading codes of the respective channels and separates the spread demodulated signals of said respective channels and the interference eliminating means subtracts the spread demodulated signals other than the desired signals from said reception signals.

7. A base station apparatus comprising the radio reception apparatus according to claim 1.

8. A communication terminal apparatus comprising the radio reception apparatus according to claim 1.

9. A direction of arrival estimation method comprising the steps of:
    generating an intensity distribution of reception signals with respect to directions of arrival of signals;
    estimating the directions of arrival of signals for each band in said intensity distribution;
    forming antenna directivities in the estimated directions of arrival; and
    receiving signals for said each band with said directivities and separating desired signals from the received signals.

* * * * *